US 8,209,721 B2

(12) United States Patent
Trauth

(10) Patent No.: US 8,209,721 B2
(45) Date of Patent: Jun. 26, 2012

(54) SYSTEM AND METHOD OF PROVIDING PROGRAM RECOMMENDATIONS

(75) Inventor: Kurt Trauth, San Antonio, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 505 days.

(21) Appl. No.: 11/651,430

(22) Filed: Jan. 9, 2007

(65) Prior Publication Data

US 2008/0168502 A1 Jul. 10, 2008

(51) Int. Cl.
*H04N 5/455* (2006.01)
*H04N 7/16* (2011.01)
*H04N 7/10* (2006.01)
*H04N 7/025* (2006.01)
*G06F 3/00* (2006.01)
*G06F 13/00* (2006.01)
*G06F 15/16* (2006.01)
*H04H 60/33* (2008.01)
*G06Q 30/00* (2012.01)

(52) U.S. Cl. .......... 725/46; 725/9; 725/34; 725/35; 725/39; 725/40; 725/48; 725/49; 705/26.7; 709/203

(58) Field of Classification Search .......... 725/46, 725/39, 48, 49, 91, 103, 114, 138, 144
See application file for complete search history.

(56) References Cited

U.S. PATENT DOCUMENTS

| 6,735,775 | B1 | 5/2004 | Massetti | |
|---|---|---|---|---|
| 7,027,882 | B2* | 4/2006 | Thurston et al. | 700/90 |
| 7,251,334 | B1* | 7/2007 | Sundberg | 381/56 |
| 2002/0056087 | A1 | 5/2002 | Berezowski et al. | |
| 2002/0174428 | A1* | 11/2002 | Agnihotri et al. | 725/46 |
| 2003/0093793 | A1* | 5/2003 | Gutta | 725/46 |
| 2003/0145323 | A1* | 7/2003 | Hendricks et al. | 725/34 |
| 2003/0195863 | A1 | 10/2003 | Marsh | |
| 2004/0001081 | A1 | 1/2004 | Marsh | |
| 2004/0088729 | A1 | 5/2004 | Petrovic et al. | |
| 2004/0216156 | A1 | 10/2004 | Wagner | |
| 2005/0192987 | A1 | 9/2005 | Marsh | |
| 2006/0020973 | A1* | 1/2006 | Hannum et al. | 725/46 |
| 2006/0026642 | A1* | 2/2006 | Schaffer et al. | 725/46 |
| 2006/0179454 | A1 | 8/2006 | Shusman | |
| 2006/0282856 | A1* | 12/2006 | Errico et al. | 725/46 |
| 2007/0157221 | A1* | 7/2007 | Ou et al. | 725/10 |
| 2007/0250861 | A1* | 10/2007 | Angiolillo et al. | 725/46 |
| 2008/0133344 | A1* | 6/2008 | Hyder et al. | 705/14 |

* cited by examiner

*Primary Examiner* — Joseph P Hirl
*Assistant Examiner* — Mary A Kay
(74) *Attorney, Agent, or Firm* — Toler Law Group, PC

(57) ABSTRACT

A method of providing program recommendations is disclosed that includes receiving a plurality of recommendations related to a television program listed by an electronic program guide from a plurality of first set-top box devices. Further, the method includes receiving a request for the electronic program guide from a second set-top box device. The method also includes determining an aggregated total of the plurality of recommendations, wherein a weighting factor is applied to each recommendation received from one of the plurality of first set-top box devices that is associated with a community related to the second set-top box device.

23 Claims, 11 Drawing Sheets

SYSTEM AND METHOD OF PROVIDING PROGRAM RECOMMENDATIONS

FIELD OF THE DISCLOSURE

The present disclosure is generally related to systems and methods of providing program recommendations.

BACKGROUND

Technological advancements in television and video transmission services have enabled content providers to offer viewers a broad range of entertainment. For example, evolutions from broadcast transmission, to off-air broadcasting, to cable and satellite transmissions have allowed content providers to increase programming from fifty channels to over five hundred channels. The quantity and variety of content that content providers offer can make choosing a program difficult. In many cases, viewers may wish to receive programming recommendations. Typically, program recommendations are based on ratings of the most popular television programming that are sampled and published by research organizations. These publications are available weeks or even months after a program airs. Hence, there is a need for an improved system and method of providing program recommendations.

DETAILED DESCRIPTION OF THE DRAWINGS

Figure 1:
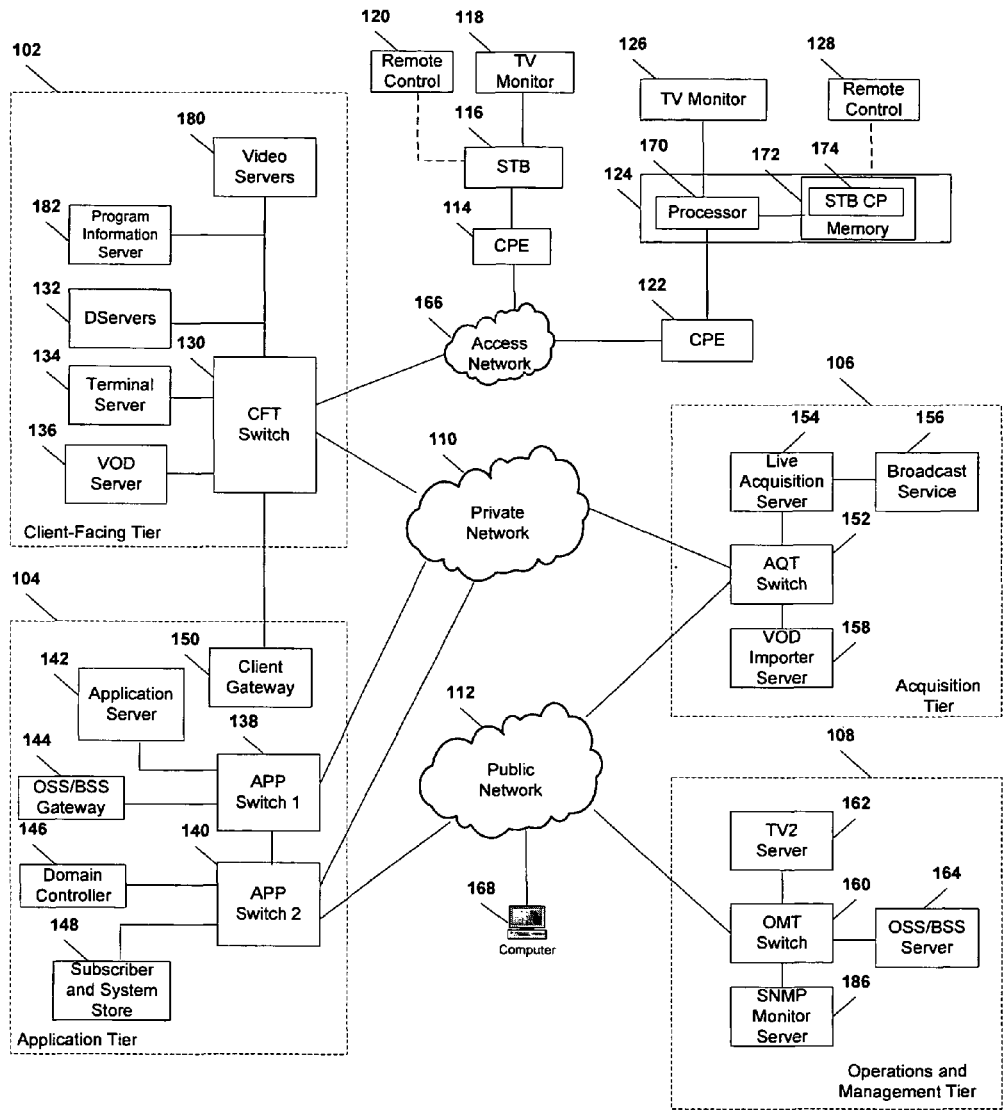
FIG. 1 is a block diagram illustrating an embodiment of a system to provide program recommendations.

A system to provide program recommendations is disclosed that includes a program information server having a processor and a memory device accessible to the processor. The memory device includes instructions executable by the processor to receive a plurality of recommendations related to a television program listed by an electronic program guide (EPG) from a plurality of first set-top box devices. The memory device also includes instructions executable by the processor to receive a request for the EPG from a second set-top box device. Further, the memory device includes instructions executable by the processor to determine an aggregated total of the plurality of recommendations, wherein a weighting factor is applied to each recommendation received from a first set-top box device that is associated with a community related to the second set-top box device. In a particular embodiment, the memory device includes instructions executable by the processor to alter a listing associated with the television program within the electronic program guide to indicate that the listing represents a recommended program when the aggregated total of recommendations associated with the at least one television program exceeds a threshold.

In another embodiment, a method of providing program recommendations is disclosed that includes receiving a plurality of recommendations related to a television program listed by an electronic program guide (EPG) from a plurality of first set-top box devices. Further, the method includes receiving a request for the electronic program guide from a second set-top box device. The method also includes determining an aggregated total of the plurality of recommendations, wherein a weighting factor is applied to each recommendation received from a first set-top box device that is associated with a community related to the second set-top box device. In a particular embodiment, the method includes generating the EPG, wherein a listing of the television program within the EPG is altered when the aggregated total exceeds a threshold value In another embodiment, a method of providing program recommendations is disclosed that includes sending a request from a set-top box device to a server for data related to an electronic program guide (EPG). The method also includes receiving the data related to the EPG and data related to recommendations of a television program from the server and generating the EPG, where a listing of the television program within the EPG is altered when the aggregated total of the recommendations exceeds a threshold value.

In another embodiment, a processor-readable medium is disclosed that includes instructions executable by a processor to receive a plurality of recommendations related to a television program listed by an electronic program guide from a plurality of first set-top box devices. The processor-readable medium also includes instructions executable by the processor to receive a request for the electronic program guide from a second set-top box device. The processor-readable medium also includes instructions executable by the processor to determine an aggregated total of the plurality of recommendations, wherein a weighting factor is applied to each recommendation received from a first set-top box device that is associated with a community related to the second set-top box device. The processor-readable medium also includes instructions executable by the processor to alter a listing associated with the television program within the electronic program guide to indicate that the listing represents a recommended program when the aggregated total of recommendations associated with the at least one television program exceeds a threshold.

Referring to FIG. 1, an illustrative embodiment of an Internet Protocol Television (IPTV) system that may be used to provide program recommendations is illustrated and is generally designated 100. As shown, the system 100 can include a client facing tier 102, an application tier 104, an acquisition tier 106, and an operations and management tier 108. Each tier 102, 104, 106, 108 is coupled to a private network 110; to a public network 112, such as the Internet; or to both the private network 110 and the public network 112. For example, the client-facing tier 102 can be coupled to the private network 110. Further, the application tier 104 can be coupled to the private network 110 and to the public network 112. The acquisition tier 106 can also be coupled to the private network 110 and to the public network 112. Additionally, the operations and management tier 108 can be coupled to the public network 112.

As illustrated in FIG. 1, the various tiers 102, 104, 106, 108 communicate with each other via the private network 110 and the public network 112. For instance, the client-facing tier 102 can communicate with the application tier 104 and the acquisition tier 106 via the private network 110. The application tier 104 can communicate with the acquisition tier 106 via the private network 110. Further, the application tier 104 can communicate with the acquisition tier 106 and the operations and management tier 108 via the public network 112. Moreover, the acquisition tier 106 can communicate with the operations and management tier 108 via the public network 112. In a particular embodiment, elements of the application tier 104, including, but not limited to, a client gateway 150, can communicate directly with the client-facing tier 102.

The client-facing tier 102 can communicate with user equipment via an access network 166, such as an Internet Protocol Television (IPTV) access network. In an illustrative embodiment, customer premises equipment (CPE) 114, 122 can be coupled to a local switch, router, or other device of the access network 166. The client-facing tier 102 can communicate with a first representative set-top box device 116 via the first CPE 114 and with a second representative set-top box device 124 via the second CPE 122. In a particular embodiment, the first representative set-top box device 116 and the first CPE 114 can be located at a first customer premise, and the second representative set-top box device 124 and the second CPE 122 can be located at a second customer premise. In another particular embodiment, the first representative set-top box device 116 and the second representative set-top box device 124 can be located at a single customer premise, both coupled to one of the CPE 114, 122. The CPE 114, 122 can include routers, local area network devices, modems, such as digital subscriber line (DSL) modems, any other suitable devices for facilitating communication between a set-top box device and the access network 166, or any combination thereof.

In an exemplary embodiment, the client-facing tier 102 can be coupled to the CPE 114, 122 via fiber optic cables. In another exemplary embodiment, the CPE 114, 122 can be digital subscriber line (DSL) modems that are coupled to one or more network nodes via twisted pairs, and the client-facing tier 102 can be coupled to the network nodes via fiber-optic cables. Each set-top box device 116, 124 can process data received via the access network 166, via an IPTV software platform, such as Microsoft® TV IPTV Edition.

The first set-top box device 116 can be coupled to a first external display device, such as a first television monitor 118, and the second set-top box device 124 can be coupled to a second external display device, such as a second television monitor 126. Moreover, the first set-top box device 116 can communicate with a first remote control 120, and the second set-top box device 124 can communicate with a second remote control 128. The set-top box devices 116, 124 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an exemplary, non-limiting embodiment, each set-top box device 116, 124 can receive data, video, or any combination thereof, from the client-facing tier 102 via the access network 166 and render or display the data, video, or any combination thereof, at the display device 118, 126 to which it is coupled. In an illustrative embodiment, the set-top box devices 116, 124 can include tuners that receive and decode television programming signals or packet streams for transmission to the display devices 118, 126. Further, the set-top box devices 116, 124 can include a STB processor 170 and a STB memory device 172 that is accessible to the STB processor 170. In one embodiment, a computer program, such as the STB computer program 174, can be embedded within the STB memory device 172.

In an illustrative embodiment, the client-facing tier 102 can include a client-facing tier (CFT) switch 130 that manages communication between the client-facing tier 102 and the access network 166 and between the client-facing tier 102 and the private network 110. As illustrated, the CFT switch 130 is coupled to one or more data servers, such as D-servers 132, that store, format, encode, replicate, or otherwise manipulate or prepare video content for communication from the client-facing tier 102 to the set-top box devices 116, 124. The CFT switch 130 can also be coupled to a terminal server 134 that provides terminal devices with a connection point to the private network 110. In a particular embodiment, the CFT switch 130 can be coupled to a video-on-demand (VOD) server 136 that stores or provides VOD content imported by the IPTV system 100. Further, the CFT switch 130 is coupled to one or more video servers 180 that receive video content and transmit the content to the set-top boxes 116, 124 via the access network 166. In addition, the CFT switch can be coupled to a program information server 182 that collects and provides program information, such as program recommendations, to the set-top box devices 116, 124.

In an illustrative embodiment, the client-facing tier 102 can communicate with a large number of set-top boxes, such as the representative set-top boxes 116, 124, over a wide geographic area, such as a metropolitan area, a viewing area, a statewide area, a regional area, a nationwide area or any other suitable geographic area, market area, or subscriber or customer group that can be supported by networking the client-facing tier 102 to numerous set-top box devices. In a particular embodiment, the CFT switch 130, or any portion thereof, can include a multicast router or switch that communicates with multiple set-top box devices via a multicast-enabled network.

As illustrated in FIG. 1, the application tier 104 can communicate with both the private network 110 and the public network 112. The application tier 104 can include a first application tier (APP) switch 138 and a second APP switch 140. In a particular embodiment, the first APP switch 138 can be coupled to the second APP switch 140. The first APP switch 138 can be coupled to an application server 142 and to an OSS/BSS gateway 144. In a particular embodiment, the application server 142 can provide applications to the set-top box devices 116, 124 via the access network 166, which enable the set-top box devices 116, 124 to provide functions, such as interactive program guides, video gaming, display, messaging, processing of VOD material and other IPTV content, etc. In an illustrative embodiment, the application server 142 can provide location information to the set-top box devices 116, 124. In a particular embodiment, the OSS/BSS gateway 144 includes operation systems and support (OSS) data, as well as billing systems and support (BSS) data. In one embodiment, the OSS/BSS gateway 144 can provide or restrict access to an OSS/BSS server 164 that stores operations and billing systems data.

The second APP switch 140 can be coupled to a domain controller 146 that provides Internet access, for example, to users at their computers 168 via the public network 112. For example, the domain controller 146 can provide remote Internet access to IPTV account information, e-mail, personalized Internet services, or other online services via the public network 112. In addition, the second APP switch 140 can be coupled to a subscriber and system store 148 that includes account information, such as account information that is associated with users who access the IPTV system 100 via the private network 110 or the public network 112. In an illustrative embodiment, the subscriber and system store 148 can store subscriber or customer data and create subscriber or customer profiles that are associated with IP addresses, stock-keeping unit (SKU) numbers, other identifiers, or any combination thereof, of corresponding set-top box devices 116, 124. In another illustrative embodiment, the subscriber and system store can store data associated with capabilities of set-top box devices associated with particular customers.

In a particular embodiment, the application tier 104 can include a client gateway 150 that communicates data directly to the client-facing tier 102. In this embodiment, the client gateway 150 can be coupled directly to the CFT switch 130. The client gateway 150 can provide user access to the private network 110 and the tiers coupled thereto. In an illustrative embodiment, the set-top box devices 116, 124 can access the IPTV system 100 via the access network 166, using information received from the client gateway 150. User devices can access the client gateway 150 via the access network 166, and the client gateway 150 can allow such devices to access the private network 110 once the devices are authenticated or verified. Similarly, the client gateway 150 can prevent unauthorized devices, such as hacker computers or stolen set-top box devices from accessing the private network 110, by denying access to these devices beyond the access network 166.

For example, when the first representative set-top box device 116 accesses the client-facing tier 102 via the access network 166, the client gateway 150 can verify subscriber information by communicating with the subscriber and system store 148 via the private network 110. Further, the client gateway 150 can verify billing information and status by communicating with the OSS/BSS gateway 144 via the private network 110. In one embodiment, the OSS/BSS gateway 144 can transmit a query via the public network 112 to the OSS/BSS server 164. After the client gateway 150 confirms subscriber and/or billing information, the client gateway 150 can allow the set-top box device 116 to access IPTV content and VOD content at the client-facing tier 102. If the client gateway 150 cannot verify subscriber information for the set-top box device 116, e.g., because it is connected to an unauthorized twisted pair, the client gateway 150 can block transmissions to and from the set-top box device 116 beyond the access network 166.

As indicated in FIG. 1, the acquisition tier 106 includes an acquisition tier (AQT) switch 152 that communicates with the private network 110. The AQT switch 152 can also communicate with the operations and management tier 108 via the public network 112. In a particular embodiment, the AQT switch 152 can be coupled to a live acquisition server 154 that receives or acquires television content, movie content, advertisement content, other video content, or any combination thereof, from a broadcast service 156, such as a satellite acquisition system or satellite head-end office. In a particular embodiment, the live acquisition server 154 can transmit content to the AQT switch 152, and the AQT switch 152 can transmit the content to the CFT switch 130 via the private network 110.

In an illustrative embodiment, content can be transmitted to the D-servers 132, where it can be encoded, formatted, stored, replicated, or otherwise manipulated and prepared for communication from the video server(s) 180 to the set-top box devices 116, 124. The CFT switch 130 can receive content from the video server(s) 180 and communicate the content to the CPE 114, 122 via the access network 166. The set-top box devices 116, 124 can receive the content via the CPE 114, 122, and can transmit the content to the television monitors 118, 126. In an illustrative embodiment, video or audio portions of the content can be streamed to the set-top box devices 116, 124.

Further, the AQT switch 152 can be coupled to a video-on-demand importer server 158 that receives and stores television or movie content received at the acquisition tier 106 and communicates the stored content to the VOD server 136 at the client-facing tier 102 via the private network 110. Additionally, at the acquisition tier 106, the video-on-demand (VOD) importer server 158 can receive content from one or more VOD sources outside the IPTV system 100, such as movie studios and programmers of non-live content. The VOD importer server 158 can transmit the VOD content to the AQT switch 152, and the AQT switch 152, in turn, can communicate the material to the CFT switch 130 via the private network 110. The VOD content can be stored at one or more servers, such as the VOD server 136.

When users issue requests for VOD content via the set-top box devices 116, 124, the requests can be transmitted over the access network 166 to the VOD server 136, via the CFT switch 130. Upon receiving such requests, the VOD server 136 can retrieve the requested VOD content and transmit the content to the set-top box devices 116,124 across the access network 166, via the CFT switch 130. The set-top box devices 116, 124 can transmit the VOD content to the television monitors 118, 126. In an illustrative embodiment, video or audio portions of VOD content can be streamed to the set-top box devices 116, 124.

FIG. 1 further illustrates that the operations and management tier 108 can include an operations and management tier (OMT) switch 160 that conducts communication between the operations and management tier 108 and the public network 112. In the embodiment illustrated by FIG. 1, the OMT switch 160 is coupled to a TV2 server 162. Additionally, the OMT switch 160 can be coupled to an OSS/BSS server 164 and to a simple network management protocol (SNMP) monitor server 186 that monitors network devices within or coupled to the IPTV system 100. In a particular embodiment, the OMT switch 160 can communicate with the AQT switch 152 via the public network 112.

In an illustrative embodiment, the live acquisition server 154 can transmit content to the AQT switch 152, and the AQT switch 152, in turn, can transmit the content to the OMT switch 160 via the public network 112. In this embodiment, the OMT switch 160 can transmit the content to the TV2 server 162 for display to users accessing the user interface at the TV2 server 162. For example, a user can access the TV2 server 162 using a personal computer 168 coupled to the public network 112.

In a particular illustrative embodiment, a user can issue a request to a set-top box device, such as the second representative set-top box device 124, to view an electronic program guide (EPG). The set-top box processor 170 can be configured to transmit the request via the access network 166 to the program information server 182. The program information server 182 can generate the EPG and transmit the EPG to the set-top box device 124 via the access network 166. The set-top box device 124 can receive the EPG via the CPE 122, for example, and transmit the EPG to the television monitor 126. Alternatively, the program information server 182 can send data related to the EPG to the set-top box device 124, and the set-top box device 124 can generate the EPG based on the data.

The EPG includes listings associated with television programs. In a particular embodiment, a user can indicate a program recommendation related to one or more of the television programs. In an illustrative embodiment, the user can indicate a program recommendation by selecting a programmable or dedicated key of the remote control 128, by interacting with a graphical user interface (GUI), such as the GUIs illustrated in FIGS. 7-8, or any combination thereof. The program information server 182 can receive program recommendations from set-top boxes, such as the set-top box devices 116 and 124, and store data related to the recommendations. In another embodiment, a recommendation may be received from the computer 168 communicating with the program information server 182 through a web portal accessible via the public network 112.

Figure 6:
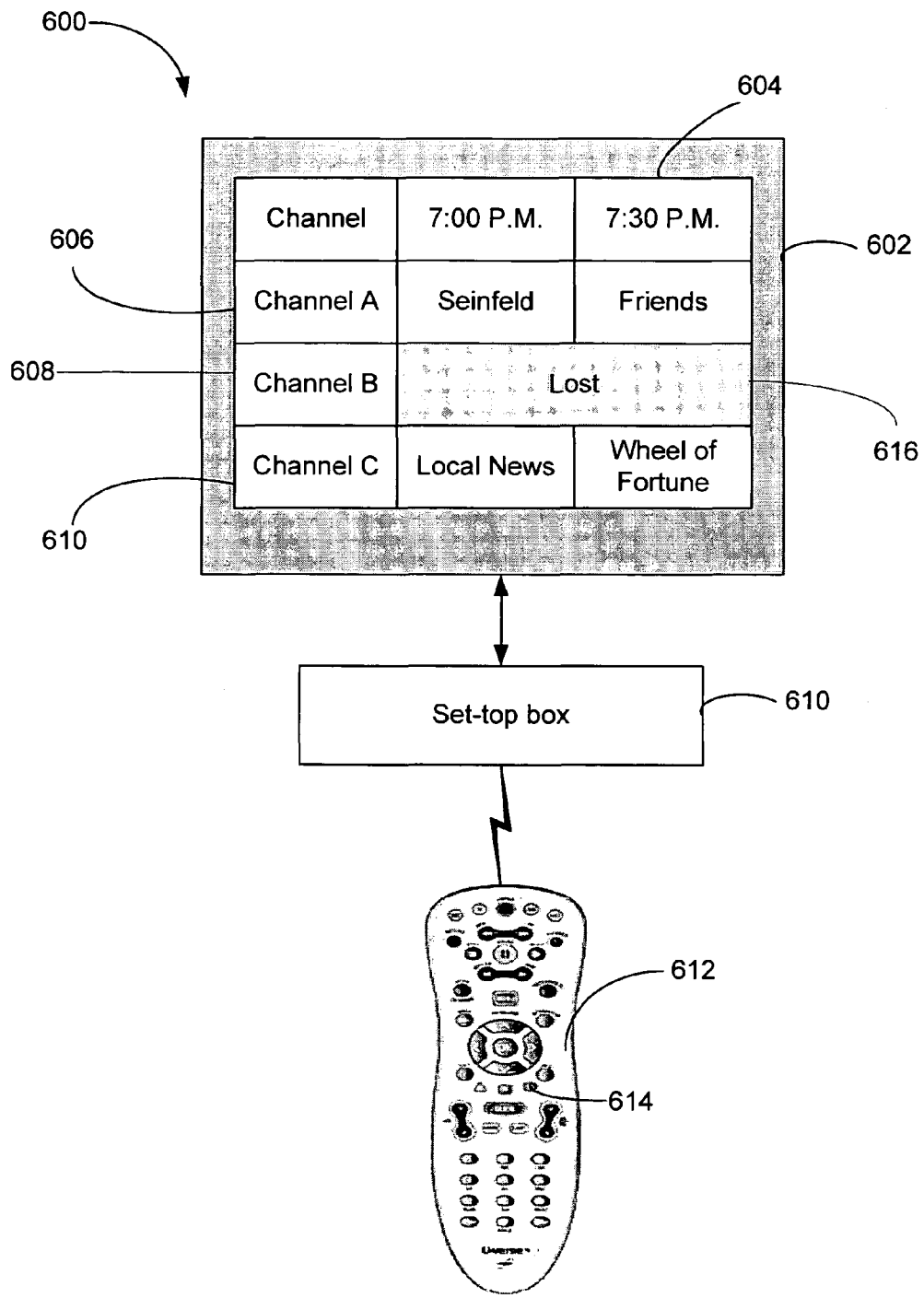
FIG. 6 is a diagram of a particular illustrative embodiment of a graphical user interface to provide program recommendations.
Figure 10:
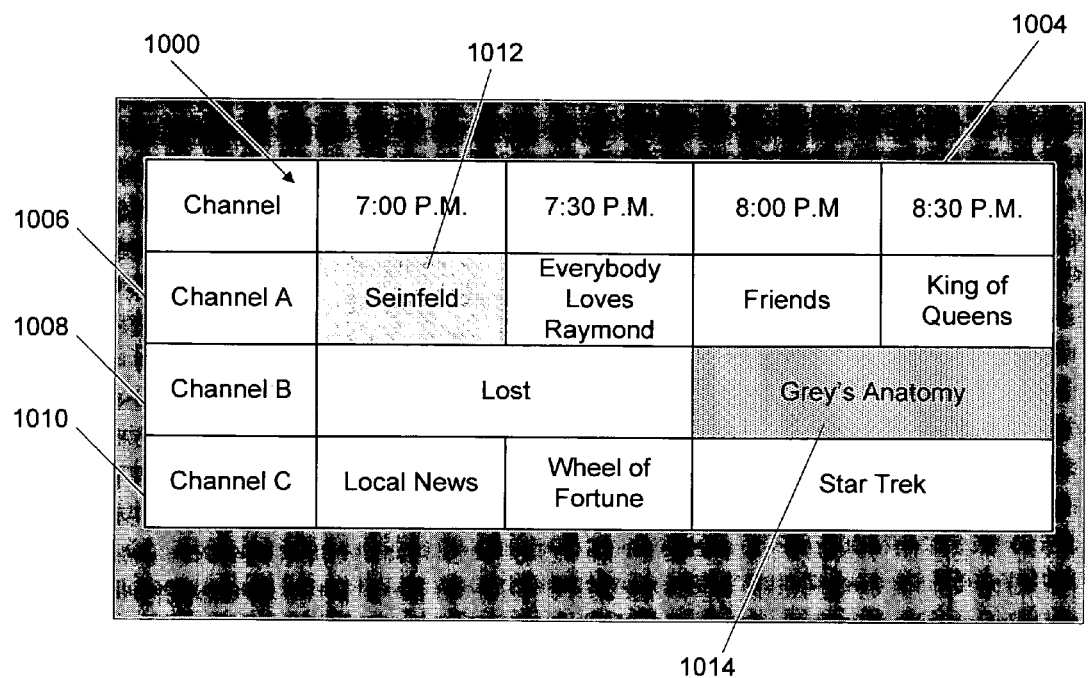
FIG. 10 is a diagram of a fifth particular illustrative embodiment of a graphical user interface to provide program recommendations.

In a particular embodiment, the appearance of listings associated with one or more particular television programs in the EPG may be altered to indicate that the program is a recommended program. For example, the background color of a listing may be altered or the font associated with a listing may be changed. In another illustrative embodiment, a listing in the EPG may be altered by changing the order of the particular listing with respect to the other listings in the EPG. In still another illustrative embodiment, the listing may be altered according to a user preference stored at the set-top box device 124. The EPG can be altered at the program information server 182 based on recommendation data received from various set-top box devices, such as one or more set-top box devices associated with a community related to the set-top box device 124. Alternatively, the EPG can be altered by the set-top box device 124 based on recommendation data received at the set-top box device 124 from the program information server 182, from a user, from another set-top box device, or any combination thereof. Examples of listing alterations are illustrated in FIGS. 6 and 10.

In an illustrative, non-limiting embodiment, a set-top box device, such as the set-top box device 116, can be associated with a community of set-top box devices defined by a user associated with the set-top box device 124. A listing for a television program in the EPG may be altered when recommendations received from set-top box devices within the community exceed a threshold number, such as a threshold number of community recommendations associated with the television program. In an illustrative embodiment, a user may define a community to be associated with the set-top box device 124 by interacting with a graphical user interface (GUI), such as the GUI illustrated in FIG. 9. In another illustrative embodiment, the user may define the community via the public network 112 by entering inputs through a graphical user interface of an Internet portal website accessed using the computer 168.

In an illustrative embodiment, a user may define a community associated with the set-top box device 124 based on other set-top box users, such as a user associated with the set-top box device 116. For example, a user may define a "Friends & Family" community by entering a set-top box identification number for a set-top box device associated with a member of the user's family. In another illustrative embodiment, a user may define a community based on set-top box devices that meet certain criteria selected by the user. For example, a user may define a community as all of the set-top box devices located within a particular geographic region and/or all of the set-top box devices that are associated with users in a particular age range. In yet another illustrative embodiment, a user may define a community by choosing from communities designated by a content provider.

In a particular embodiment, the user can define multiple communities associated with the set-top box device 124. In an illustrative embodiment, each community defined by the user may have the same threshold level or a different threshold level for listings of the EPG to be altered based on recommendations. For example, the number of recommendations from a family-based community that are required to alter a listing may be lower than the number of recommendations from a regional community that are required to alter the listing. In another illustrative embodiment, a listing for a television program in the EPG may be altered in a particular manner based on whether the recommendations from a particular community exceed the threshold level for that community. For example, the background color for a listing may be changed to blue if the number of recommendations received for the listing exceeds the threshold for a first particular community, while the background color for the listing may be changed to green if the number of recommendations received for the listing exceeds the threshold for a second particular community.

In a particular embodiment, the recommendations received for a particular listing in the EPG may be weighted, such that a recommendation associated with a particular set-top box device is considered more important, and contributes more toward reaching the threshold level required to alter a listing, than a recommendation associated with another set-top box device. For example, a recommendation received from a set-top box device associated with a "Friends & Family" community may be weighted higher than a recommendation received from a set-top box device associated with a community defined according to a geographic region.

Figure 2:
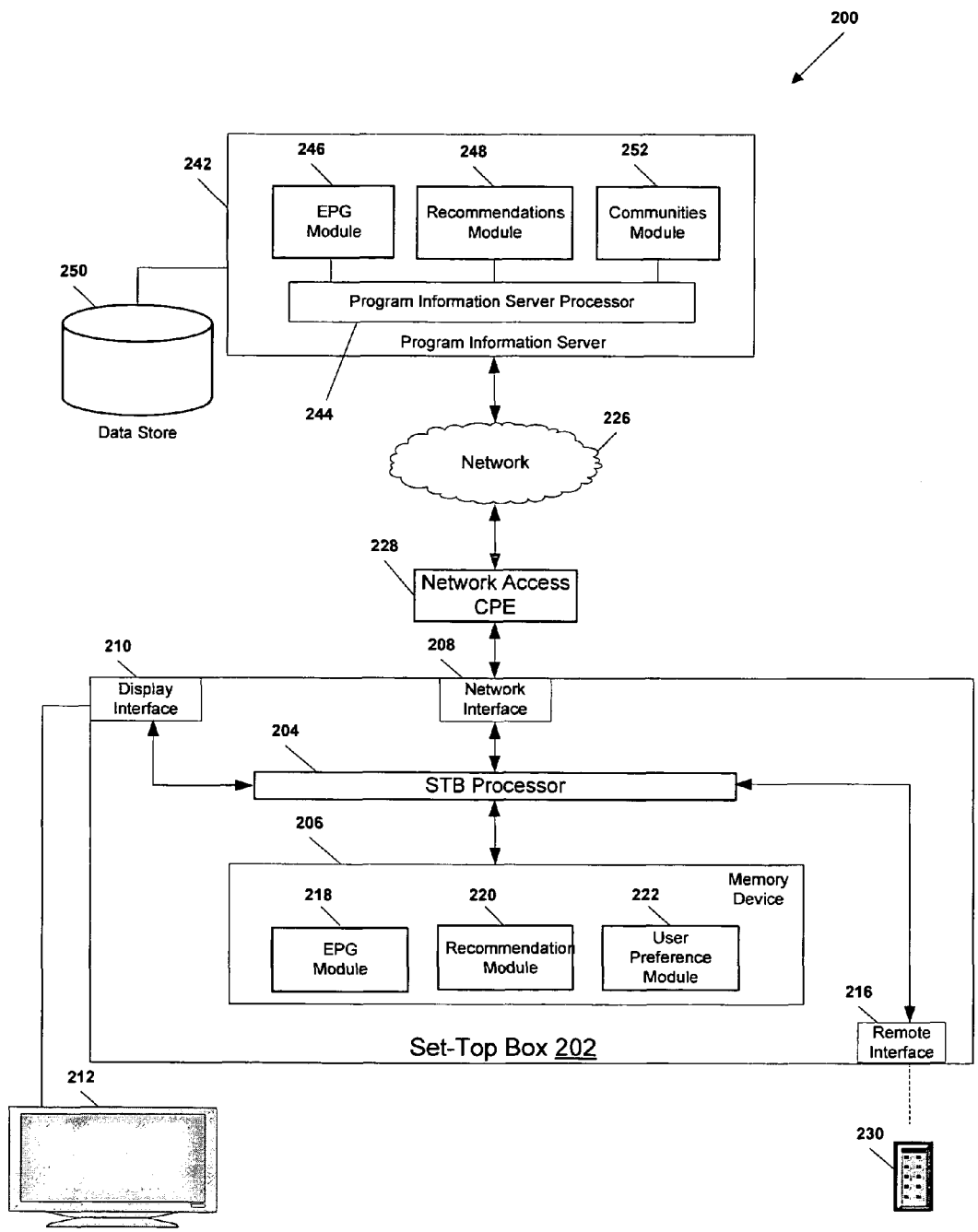
FIG. 2 is a block diagram of a second particular illustrative embodiment of a system to provide program recommendations.

FIG. 2 is a block diagram of a second particular illustrative embodiment of a system 200 to provide program recommendations. The system 200 includes a set-top box device 202 that communicates with a program information server 242 via a video distribution network 226. In a particular embodiment, the network 226 can be a cable network or satellite network. In another embodiment, the network 226 can be a private access network of an Internet Protocol Television (IPTV) system. As indicated in FIG. 2, the set-top box device 202 includes a STB processor 204 and a memory device 206 accessible to the STB processor 204. The STB processor 204 can communicate video content to a display device 212 via a display interface 210. In addition, the STB processor 204 can receive commands from a remote control device 230 via a remote interface 216.

In a particular embodiment, the STB processor 204 can communicate with the video distribution network 226, via the network interface 208. In an illustrative, non-limiting embodiment, the network access customer premises equipment (CPE) 228 can facilitate communication between the network interface 208 and the video distribution network 226. The network access CPE 228 can include a router, a local area network device, a modem, such as a digital subscriber line (DSL) modem, any other suitable device for facilitating communication between the network interface 208 of the set-top box device 202 and the video distribution network 226, or any combination thereof.

In a particular embodiment, the memory device 206 can include an electronic program guide (EPG) module 218 that is executable by the STB processor 204 to receive a command to send an EPG to the display device 212. For example, the STB processor can communicate with the remote control 230 via the remote interface 216 to receive a signal indicating a selection of an EPG button at the remote control device 230. Further, the EPG module 218 can be executable by the STB processor 204 to request and receive the EPG from the program information server 242. In addition, the EPG module 218 can be executable by the STB processor 204 to send the EPG to the display device 212. In an alternative embodiment, the EPG module 218 can be executable by the STB processor 204 to request and receive data from the program information server 242 related to program listings, parental ratings, plot summaries, other program information, or any combination thereof, and to generate the EPG based on the data received.

The appearance of one or more listings in the EPG can be altered to indicate that the program has been recommended by at least a pre-defined proportion of viewers within a certain group, such as a geographical or market area, a subscriber group, a user-defined community, or any combination thereof. The EPG module 218 can be executable by the STB processor 204 to receive the altered EPG from the program information server 242. Alternatively, the EPG module 218 can be executable by the STB processor 204 to receive the EPG and recommendation data from the program information server 242 and to alter the appearance of one or more listings within the EPG based on recommendation data. In another embodiment, the EPG module 218 can be executable by the STB processor 204 to receive data related to the EPG, to receive recommendation data, and to generate the altered EPG based, for example, on user preferences with regard to appearance, communities, or any combination thereof.

In a particular embodiment, the memory device 206 can include a recommendation module 220 that is executable by the STB processor 204 to receive a recommendation for a program listed in the EPG. In an illustrative embodiment, the recommendation module 220 can be executable by the STB processor 204 to send a recommendation graphical user interface (GUI) to the display device 212 in response to a request to enter a program recommendation received from the remote control device 230. The recommendation module 220 can be executable by the STB processor 204 to store a program recommendation received via the recommendation GUI, to send data to the program information server 242 indicating the recommendation, or any combination thereof.

In a particular embodiment, the memory device 206 can include a user preference module 222 that is executable by the STB processor 204 to receive and store data indicating one or more user preferences. For example, the user preference module 222 can be executable by the STB processor 204 to generate one or more graphical user interfaces to receive user preferences related to preferred appearances of listings of recommended programs within an EPG, such as a preferred color, font, arrangement within the EPG, other preferred alteration, or any combination thereof. In another example, the user preference module 222 can be executable by the STB processor 204 to receive user preferences indicating communities from which recommendations are to be considered in altering program listings. In an illustrative embodiment, the user preference module 222 can be executable by the STB processor 204 to generate a communities interface, such as the interface illustrated in FIG. 9, and to receive and store user definitions of one or more communities from which the user desires to be informed of program recommendations via the EPG.

In a particular embodiment, the program information server 242 can include a server processor 244. In addition, the program information server 240 can include an EPG module 246 that is executable by the server processor 244 to receive a request for an EPG from the set-top box device 202. In an illustrative embodiment, the EPG module 246 can be executable by the server processor 244 to generate the EPG based on a geographic location of the set-top box device 202, for example, and to send the EPG to the set-top box device 202 via the video distribution network 226. In another embodiment, the EPG module 246 can be executable by the server processor 244 to send data related to the program information to the set-top box device 202 in response to the request, and the set-top box device can generate the EPG based on the data.

In an illustrative embodiment, the EPG module 246 can be executable by the server processor 244 to generate an EPG in which the listing of one or more recommended programs is altered. For example, a listing for a program within the EPG can be altered to indicate that the program has received a threshold number of recommendations from a user-selected group of set-top boxes. In another embodiment, the EPG module 246 can be executable by the server processor 244 to send recommendations data to the set-top box device 202, and the set-top box device 202 can generate an altered EPG or alter an EPG sent by the program information server 242 to reflect one or more recommended programs.

In a particular embodiment, the program information server 240 can include a recommendations module 248 that is executable by the server processor 244 to receive and store recommendations related to programs listed by the EPG from set-top box devices, such as set-top box device 202. Further, the recommendations module 248 may be executable by the server processor 244 to receive and store program recommendations from computing devices via a public network, such as the Internet. In an illustrative embodiment, the recommendations can be stored at a data store 250 that is coupled to or integrated with the program information server 242.

In a particular embodiment, the recommendations module 248 may be executable by server processor 244 to generate one or more graphical user interfaces (GUIs) related to recommendations and to send such GUIs to the set-top box device 202 in response to a request from the set-top box device 202 to input a program recommendation. The recommendations module 248 may be executable by server processor 244 to associate each recommendation received with a respective set-top box device, to aggregate all of the recommendations received for a particular television program, to aggregate recommendations received from particular communities of set-top box devices, or any combination thereof.

In an illustrative, non-limiting embodiment, the recommendations module 248 can be executable by the server processor 244 to determine one or more communities associated with the set-top box device 202 and to weight one or more stored recommendations that have been sent by set-top box devices within the associated communities. For example, when the set-top box device 202 requests an EPG, the program information server 242 can determine which listings to alter to reflect a recommendation by determining whether a threshold number of recommendations related to a program have been received. When aggregating the stored recommendations related to the program, the program information server 242 can apply a weighting factor (e.g., 2×) to recommendations it has received from set-top box devices within a community associated with the set-top box device 202, before aggregating the recommendations and comparing the aggregated number to a threshold number. In another embodiment, the program information server 242 can apply a first weighting factor (e.g., 2×) to recommendations it has received from set-top box devices within a first community (e.g., 'Friends and Family') and a second weighting factor (e.g., 1.5×) to recommendations it has received from set-top box devices within a second community (e.g., a neighborhood).

In a particular embodiment, the program information server 240 can include a communities module 252 that is executable by the server processor 244 to store the respective communities associated with a set-top box device, such as the set-top box device 202. In an illustrative embodiment, the set-top box device 202 may be associated with a "Friends & Family" community that includes particular set-top box devices designated by a user of the set-top box device 202. In another illustrative embodiment, the set-top box device 202 may be associated with a "State of Texas" community that includes the set-top box devices located in the state of Texas. In a further illustrative embodiment, the set-top box device may be associated with a community that includes a group of set-top box devices associated with a particular subscriber service, such as the set-top box devices that are associated with a premium movie channel or a particular pay-per-view event.

For ease of explanation, the various modules 218-222, 246, 248 and 252 have been described in terms of processor-executable instructions. However, those skilled in the art will appreciate that such modules can be implemented as hardware logic, processor-executable instructions, or any combination thereof.

Figure 3:
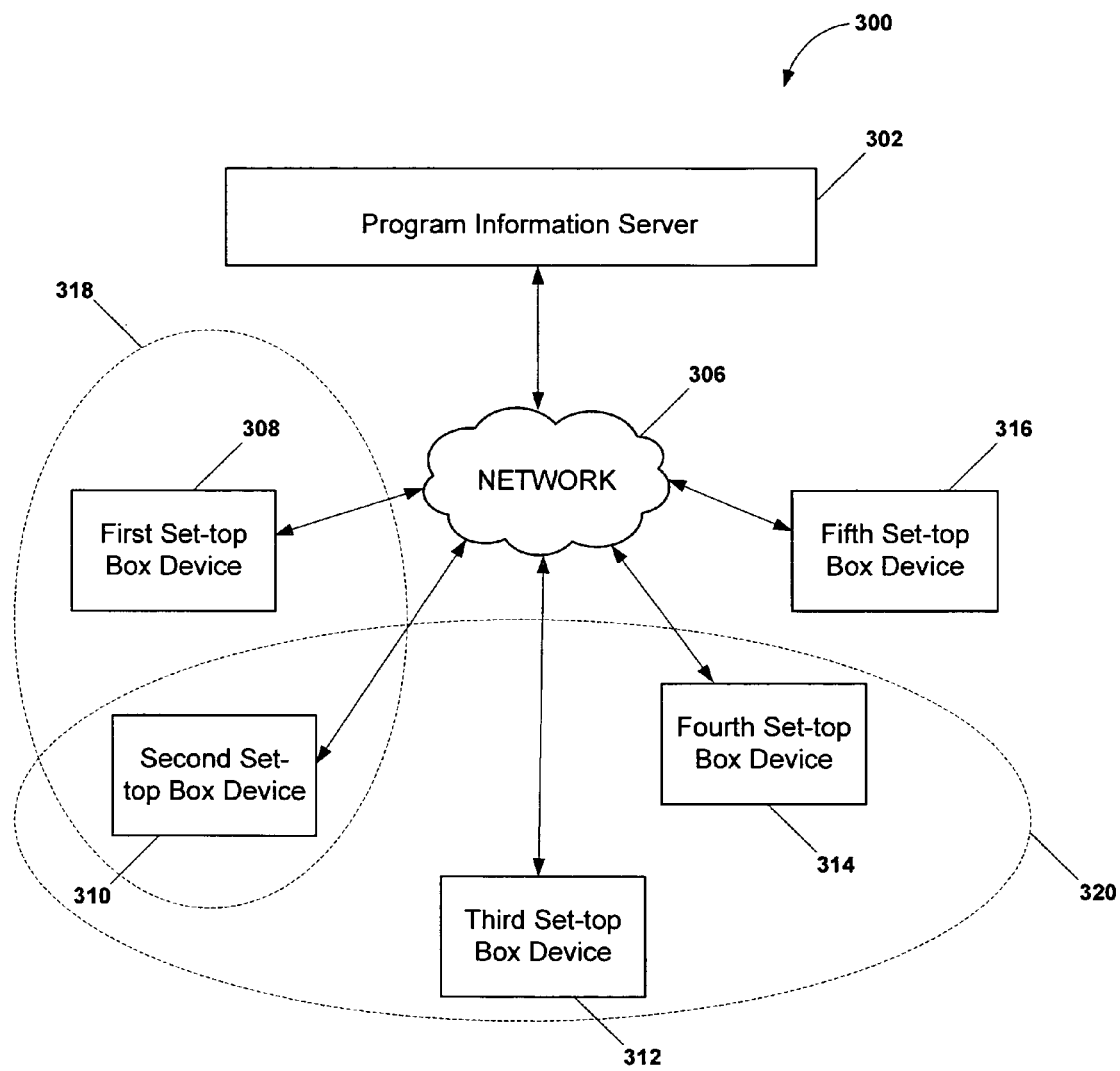
FIG. 3 is a block diagram of a third particular illustrative embodiment of a system to provide program recommendations.

FIG. 3 is a block diagram of a third particular illustrative embodiment of a system 300 to provide program recommendations. The system 300 includes a program information server 302 communicating with a plurality of set-top box devices 308-316 via a video distribution network 306, such as an Internet Protocol Television (IPTV) access network. In a particular embodiment, the set-top box devices 308-316 communicating with the program information server 302 may be associated with one or more communities designated by a user of one of the set-top box devices. For example, a user of the fifth set-top box device 316 can designate a first community 318 that includes the first set-top box device 308 and the second set-top box device 310. Further, the user can designate a second community 320 that includes the second set-top box device 310, third set-top box device 312, and fourth set-top box device 314.

In a particular embodiment, program recommendations received at the program information server 302 from the first set-top box device 308 can be weighted differently than recommendations received from the third and fourth set-top box devices 312-314 when the program information server 302 determines which listings to alter in an EPG sent to the fifth set-top box device 316. In an illustrative, non-limiting embodiment, recommendations received from set-top box devices in overlapping communities, such as the second set-top box device 310 can be weighted based on user preferences, provider preferences, an average of the first community weighting and the second community weighting, or according to other methods.

Figure 4:
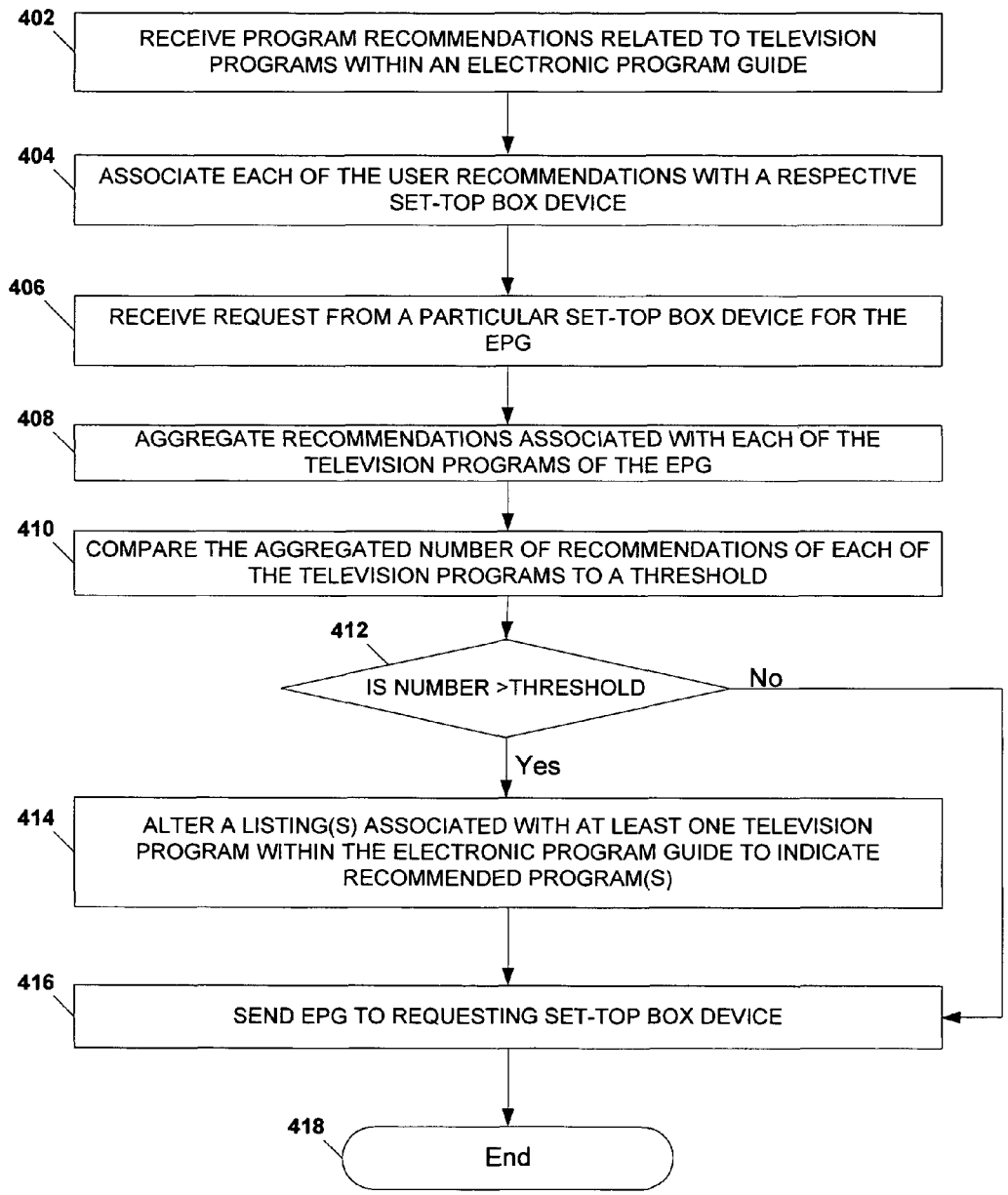
FIG. 4 is a flow diagram of a particular illustrative embodiment of method of providing program recommendations.

FIG. 4 is a flow diagram of a particular illustrative embodiment of a method of providing program recommendations. At block 402, one or more program recommendations related to television programs within an electronic program guide (EPG) are received from set-top box devices at a program information server of a private video distribution system, such as an Internet Protocol Television (IPTV) system. Proceeding to block 404, in an illustrative embodiment, each of the received program recommendations can be associated with an identification of one of the set-top box devices submitting the recommendations, such as a SKU number, an IP address, or other identification.

Moving to block 406, in a particular embodiment, the program information server can receive a request for an electronic program guide (EPG) from a particular set-top box device. Continuing to block 408, the recommendations associated with each of the television programs within the electronic program guide (EPG) are aggregated. Proceeding to block 410, the program information server compares the aggregated recommendations for each television program in the EPG with a threshold value. Moving to decision node 412, if the program information server determines that the aggregated number of recommendations is less than the threshold value, then the method proceeds to block 416.

On the other hand, if the program information server determines that the aggregated number of recommendations exceeds the threshold value, then the method proceeds to block 414, and one or more listings of the EPG are altered to indicate a recommended program. For example, a listing in the EPG may be altered by changing the background color associated with the listing, by changing a font associated with the listing, by changing the order of the listing relative to the other listings in the EPG, by making other alterations, or any combination thereof. At block 416, the EPG is sent to the requesting set-top box device. The method proceeds to terminate at 418.

Figure 5:
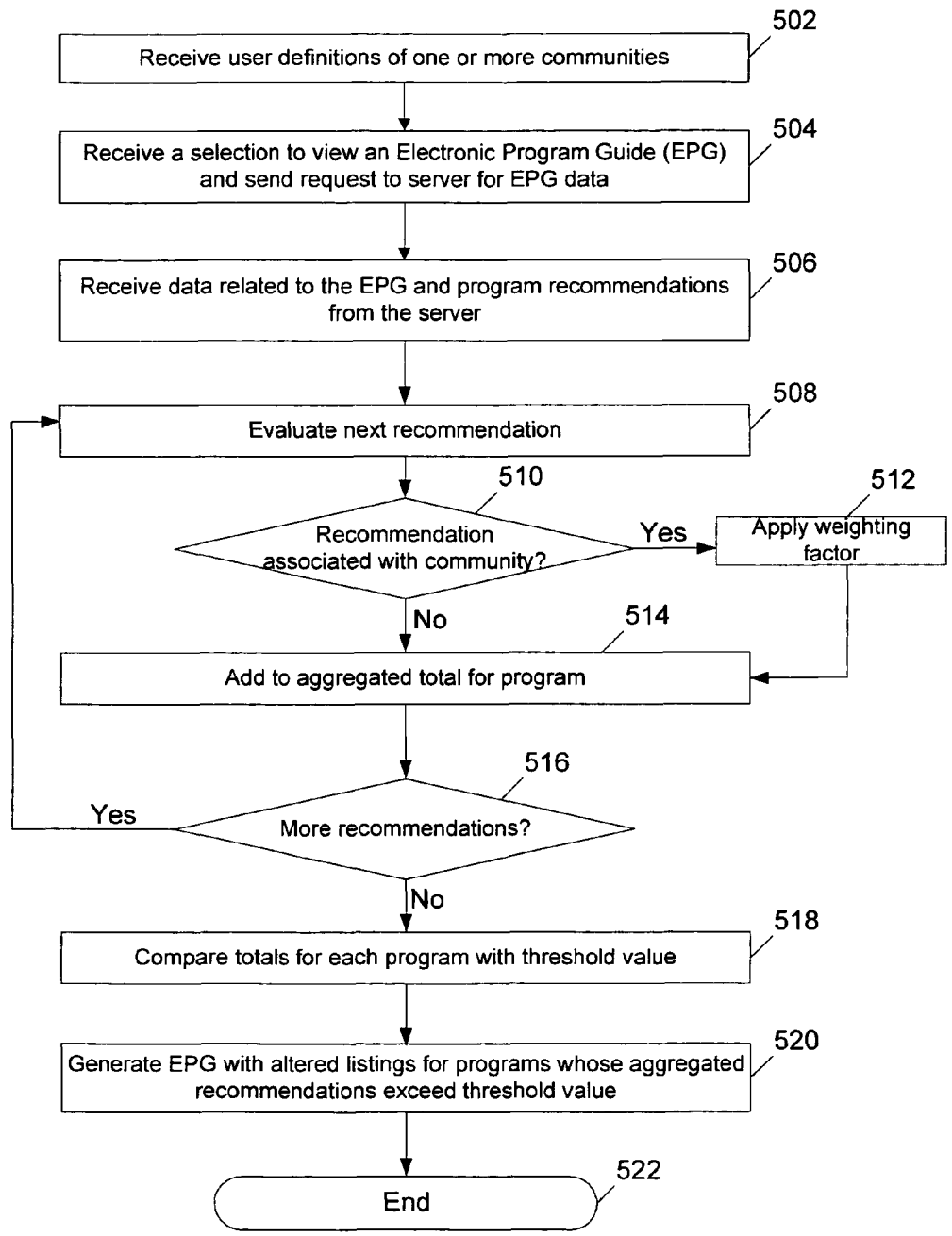
FIG. 5 is a flow diagram of a second particular illustrative embodiment of a method of providing program recommendations.

FIG. 5 is a flow diagram of a second particular illustrative embodiment of a method of providing program recommendations. At block 502 a user defines a community of set-top box devices at a set-top box device. In an illustrative embodiment, the user can interact with a community graphical user interface to input community definitions. Moving to block 504, a selection to view an electronic program guide (EPG) is received at the set-top box device, and the set-top box device sends a request for data related to the EPG to a program information server or other server of a video distribution system.

Proceeding to block 506, the data related to the EPG and to program recommendations is received from the server. Continuing to block 508, the set-top box device evaluates a next program recommendation. At decision node 510, the set-top box can determine whether the next recommendation is associated with a set-top box device of a community defined by the user. If the next recommendation is not associated with a set-top box device of a community defined by the user, the method proceeds to block 514, and the recommendation is added to an aggregated total of recommendations associated with the program to which the recommendation relates. Conversely, if the next recommendation is associated with a set-top box device of a community defined by the user, the method proceeds to block 512, and the set-top box device can apply a weighting factor to the recommendation before adding it to the aggregated total at block 514.

Moving to decision node 516, the set-top box device determines whether additional recommendations are to be evaluated. If additional recommendations are to be evaluated, the method returns to block 510 and continues until all recommendations have been added to aggregated totals for the programs to which they relate. When no more recommendations are to be evaluated, the method proceeds to block 518, and the aggregated totals for each program are compared with a threshold value. Advancing to block 520, the set-top box device generates an EPG having altered listings for programs whose aggregated total recommendations exceed the threshold value. The method terminates at 522.

FIG. 6 is a diagram of a particular illustrative embodiment of a graphical user interface 600 to provide program recommendations. The graphical user interface 600 can be displayed at a display device 602. The graphical user interface 600 may include an electronic program guide (EPG) 604 that provides a listing of television programs associated with certain channels, such as the television programs associated with Channel A 606, Channel B 608, and Channel C 610. The display device 604 may be coupled to a set-top box device 610. A remote control device 612 may be used to send input signals to set-top box device 610. In a particular embodiment, a button 614 may be used to send a recommendation input signal to set-top box device 610. In an illustrative embodiment, the remote control device 612 may be used to select a particular television program shown on the EPG 604, such as program 616, by operating the buttons of the remote control device to highlight the particular television program. Once the particular television program is selected, a user may select a button 614 on remote control device 612 to enter a recommendation for the selected television program.

Figure 7:
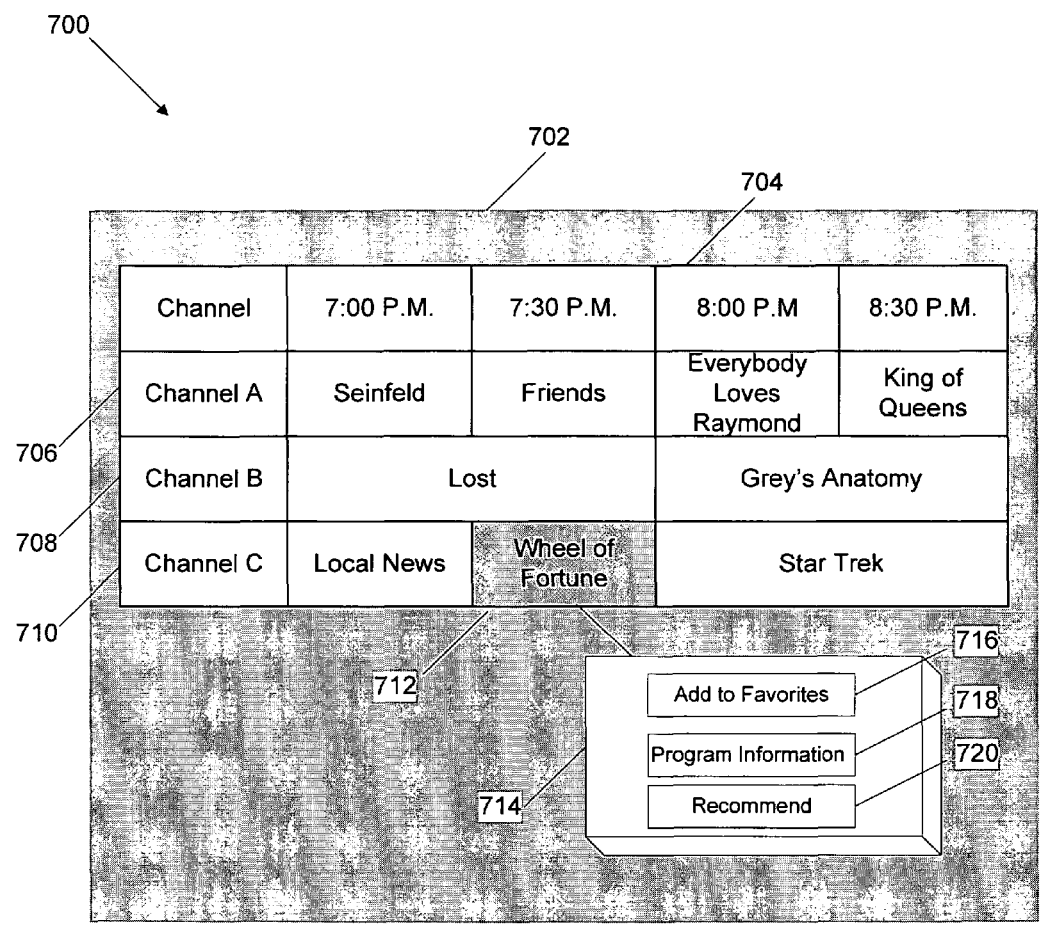
FIG. 7 is a diagram of a second particular illustrative embodiment of a graphical user interface to provide program recommendations.

FIG. 7 is a diagram of a second particular illustrative embodiment of a graphical user interface 700 to provide program recommendations. The graphical user interface 700 may be displayed at a display device 702, and includes an electronic program guide (EPG) 704. The electronic program guide 704 provides a listing of television programs associated with certain channels, such as television programs associated with Channel A 706, Channel B 708, and Channel C 710. In a particular embodiment, a program listing 712 can be selected and a recommendation input may be entered via an interface, such as a pop-up menu 714 that appears when the program listing 712 is selected. In an illustrative, non-limiting embodiment, a user may depress a particular button on a remote control device to activate the pop-up menu 714.

In an illustrative embodiment, the pop-up menu 714 can include selectable indicators 716, 718, and 720. For example, the indicator 716 can be selected to add television program 712 to a user's "Favorites" list. Further, the indicator 718 can be selected to display information related to the selected television program 712, such as an episode summary, the category of the television program, such as comedy or drama, the parental advisory rating for the program, or any combination thereof. In addition, the indicator 720 may be selected to recommend the television program 712.

Figure 8:
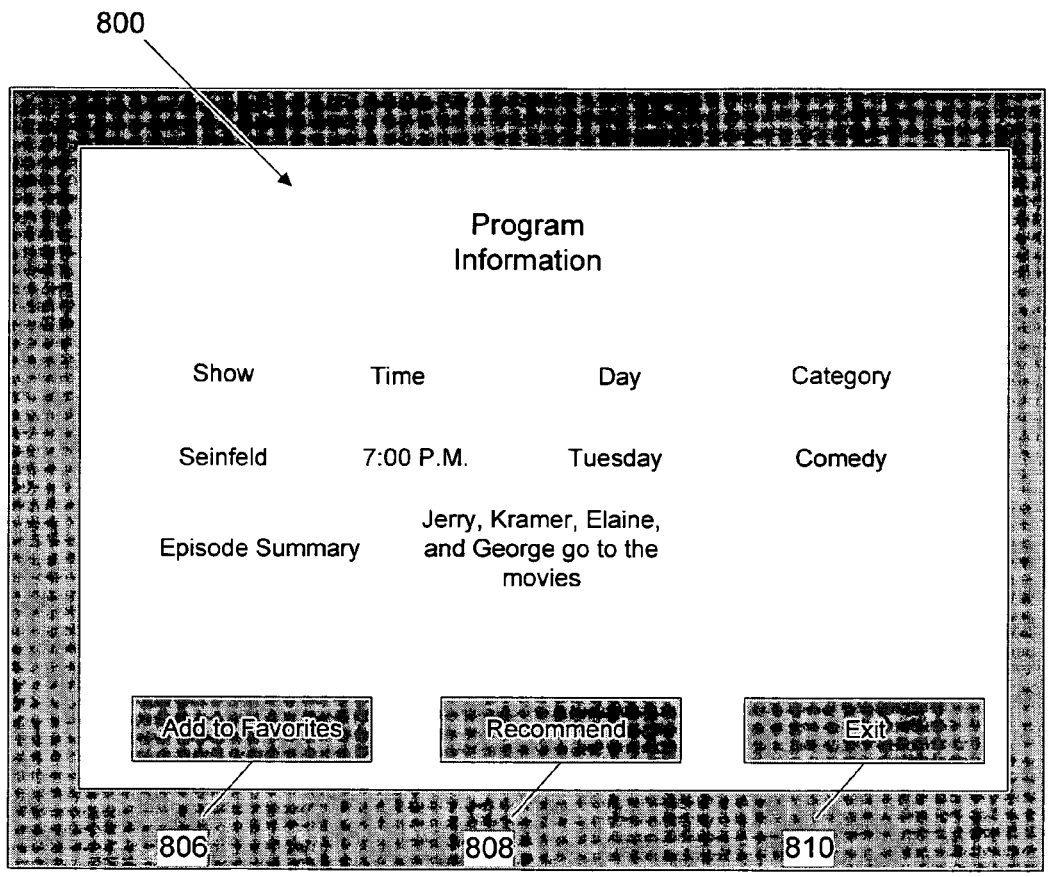
FIG. 8 is a diagram of a third particular illustrative embodiment of a graphical user interface to provide program recommendations.

FIG. 8 is a diagram of a third particular illustrative embodiment of a graphical user interface 800 to provide program recommendations. The graphical user interface 800 includes information related to a particular television program where a listing for the particular television program is shown in an electronic program guide (EPG). In an illustrative embodiment, the graphical user interface 800 may appear at a display device upon selection of the listing for the particular television program shown in the EPG.

In an illustrative embodiment, the graphical user interface 800 can include selectable indicators 806-810. For example, the indicator 806 can be selected to add television program to a user's "Favorites" list. Further, the indicator 808 can be selected to recommend the television program. In addition, the indicator 810 can be selected to exit the graphical user interface 800.

Figure 9:
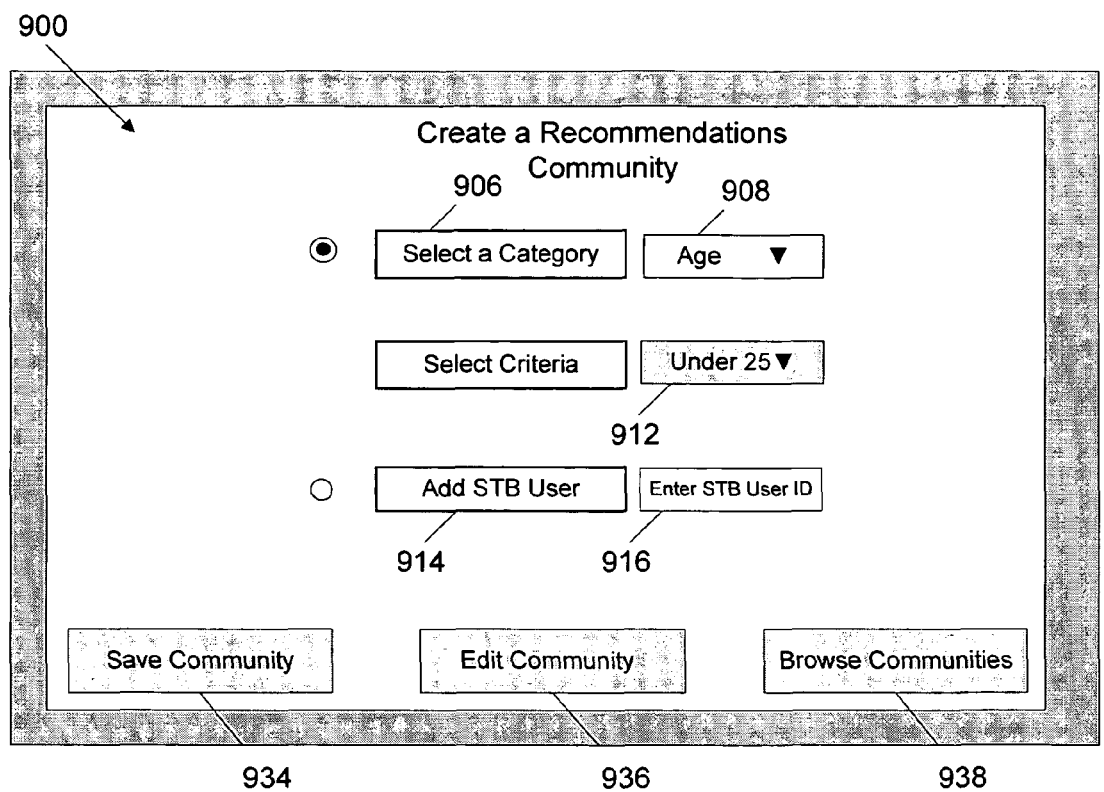
FIG. 9 is a diagram of a fourth particular illustrative embodiment of a graphical user interface to provide program recommendations.

FIG. 9 is a diagram of a fourth particular illustrative embodiment of a graphical user interface (GUI) 900 to provide program recommendations. The GUI 900 includes selectable indicators that may be used to define one or more communities of set-top box devices. In an illustrative embodiment, the GUI 900 can include a selectable indicator 906 that enables a user to select a category for a community. For example, a user may select a category for a community using a drop-down or pull-down menu 908. In an illustrative, non-limiting embodiment, a user can select a category from the menu, such as age, geographic region, favorite TV show, or profession. In an illustrative embodiment, once the user selects a particular category from the menu 908, the user can select criteria associated with the selected category via a second menu 912. For example, if the user selects the category "Age," the criteria associated with the "Age" category, such as "Under 25," may appear in the second menu 912.

In an illustrative embodiment, the GUI 900 may include a selectable indicator 914. Alternatively, or in addition to selecting categories and their corresponding criteria for a community, in a particular embodiment, a user may identify particular set-top box devices to add to a community. For example, the user can input set-top box device identifications at a field 916.

In a particular embodiment, the GUI 900 can include selectable indicators 934, 936, and 938. In an illustrative embodiment, the indicator 934 may be selected by the user to save a community defined by a user. In a particular embodiment, the indicator 936 may be selected by a user to edit a previously defined community. In a particular embodiment, the indicator 938 may selected by the user to browse communities that have previously been defined by the user.

FIG. 10 is a diagram of a fifth particular illustrative embodiment of a graphical user interface 1000 to provide program recommendations. The graphical user interface 1000 includes an electronic program guide (EPG) 1004. The electronic program guide 1004 provides a listing of television programs associated with certain channels, such as television programs associated with a Channel A 1006, a Channel B 1008, and a Channel C 1010. In a particular embodiment, the listings in the EPG associated with particular television programs may be altered based on the recommendations received for the particular television programs. For example, as illustrated in FIG. 10, the background appearance associated with the listings for the television programs 1012, 1014 have been altered relative to the other listings. In an illustrative embodiment, the listings for the television programs 1012, 1014 may be altered based on a background color or background pattern selected by a user.

In a particular embodiment, a listing for a television program in the EPG may be altered based on the number of recommendations received for the respective television programs. In an illustrative embodiment, a listing for a television program in the EPG may be altered in a particular manner when the number of recommendations received for the television program exceeds a first threshold value and altered in a different manner when the number of recommendations received for the television program exceeds a second threshold value. For instance, the listing for the television program 1012 can be altered to indicate that recommendations received for the television program 1012 has exceeded a first threshold value. Whereas, the listing for the television program 1014 can be altered in a different manner when the number of recommendations received for the television program 1014 has exceeded a second threshold value.

Figure 11:
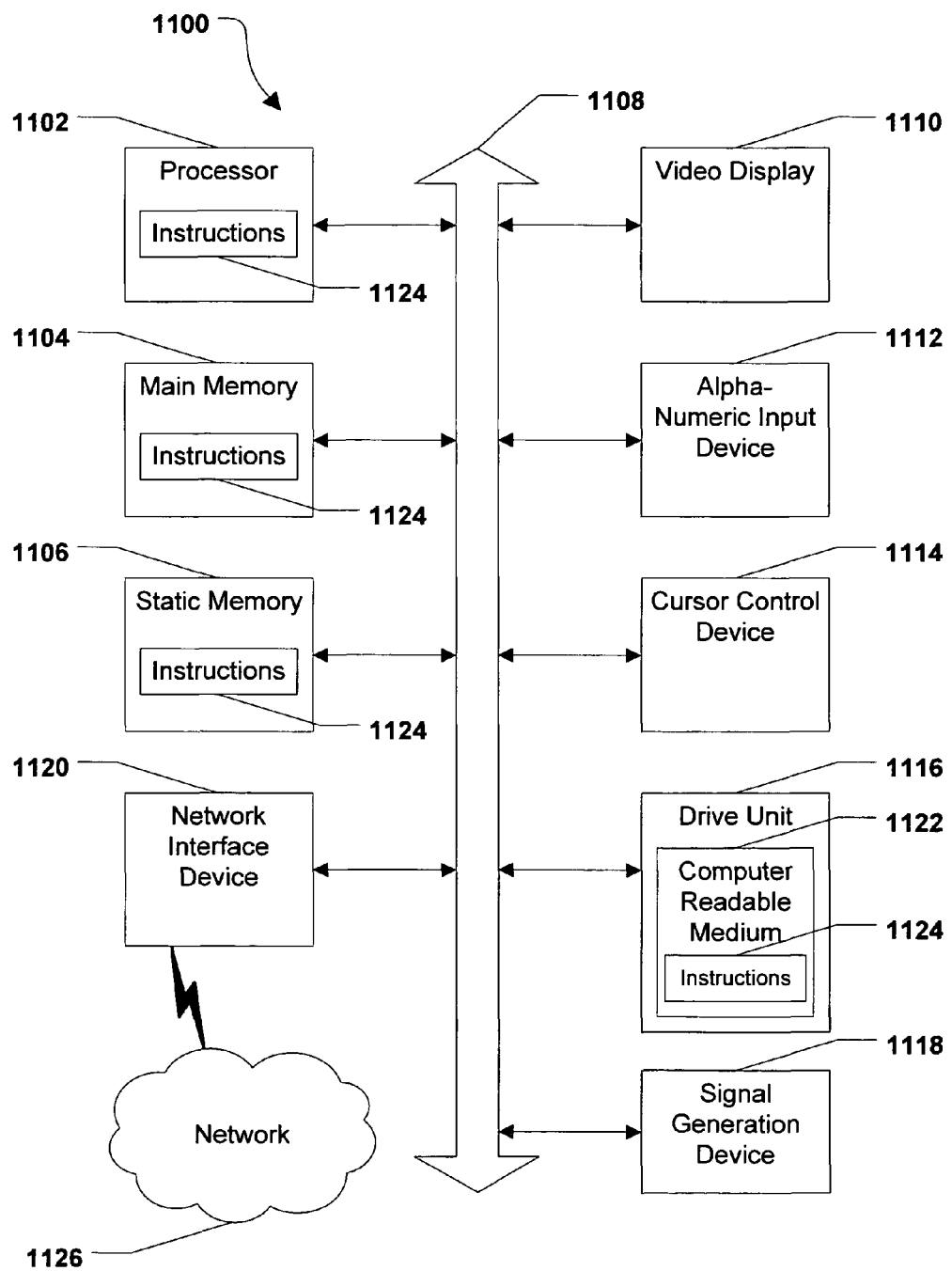
FIG. 11 is a block diagram of an illustrative embodiment of a general computer system.

Referring to FIG. 11, an illustrative embodiment of a general computer system is shown and is designated 1100. The computer system 1100 can include a set of instructions that can be executed to cause the computer system 1100 to perform any one or more of the methods or computer based functions disclosed herein. The computer system 1100, or any portion thereof, may operate as a standalone device or may be connected, e.g., using a network, to other computer systems or peripheral devices, including a server or set-top box device, as shown in FIGS. 1-2.

In a networked deployment, the computer system may operate in the capacity of an IPTV server, such as a program information server, or a set-top box device. The computer system 1100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 1100 can be implemented using electronic devices that provide voice, video or data communication. Further, while a single computer system 800 is illustrated, the term "system" shall also be taken to include any collection of systems or sub-systems that individually or jointly execute a set, or multiple sets, of instructions to perform one or more computer functions.

As illustrated in FIG. 11, the computer system 1100 may include a processor 1102, e.g., a central processing unit (CPU), a graphics-processing unit (GPU), or both. Moreover, the computer system 1100 can include a main memory 1104 and a static memory 1106 that can communicate with each other via a bus 1108. As shown, the computer system 1100 may further include a video display unit 1110, such as a liquid crystal display (LCD), an organic light emitting diode (OLED), a flat panel display, a solid state display, or a cathode ray tube (CRT). Additionally, the computer system 1100 may include an input device 1112, such as a keyboard, and a cursor control device 1114, such as a mouse. The computer system 1100 can also include a disk drive unit 1116, a signal generation device 1118, such as a speaker or remote control, and a network interface device 1120.

In a particular embodiment, as depicted in FIG. 11, the disk drive unit 1116 may include a computer-readable medium 1122 in which one or more sets of instructions 1124, e.g. software, can be embedded. Further, the instructions 1124 may embody one or more of the methods or logic as described herein. In a particular embodiment, the instructions 1124 may reside completely, or at least partially, within the main memory 1104, the static memory 1106, and/or within the processor 1102 during execution by the computer system 1100. The main memory 1104 and the processor 1102 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 1124 or receives and executes instructions 1124 responsive to a propagated signal, so that a device connected to a network 1126 can communicate voice, video or data over the network 1126. Further, the instructions 1124 may be transmitted or received over the network 1126 via the network interface device 1120.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted, that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. The software may also utilize a signal containing computer instructions. A digital file attachment to e-mail or other self-contained information archive or set of archives is considered a distribution medium equivalent to a tangible storage medium. Accordingly, the disclosure is considered to include a tangible storage medium or distribution medium as listed herein, and other equivalents and successor media, in which the software implementations herein may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of providing program recommendations, the method comprising:

receiving a plurality of recommendations related to a television program listed by an electronic program guide from a plurality of first set-top box devices;

receiving a request for the electronic program guide from a second set-top box device;

receiving selections of a first community and a second community that are to influence program recommendations for the second set-top box device;

determining a first community aggregated total for the television program based on a first community weighting factor and recommendations of the plurality of recommendations from first set-top boxes associated with members of the first community;

determining a second community aggregated total for the television program based on a second community weighting factor and recommendations of the plurality of recommendations from first set-top boxes that are associated with members of the second community;

comparing the first community aggregated total to a first threshold value to determine whether to emphasize the television program in the electronic program guide in a first manner associated with the first community; and comparing the second community aggregated total to a second threshold value to determine whether to emphasize the television program in the electronic program guide in a second manner associated with the second community.

2. The method of claim 1, further comprising generating the electronic program guide, and altering a listing of the television program within the electronic program guide when the first community aggregated total exceeds the first threshold value.

3. The method of claim 2, further comprising sending the electronic program guide to the second set-top box device.

4. The method of claim 2, wherein the listing is altered at least partially based on a user-defined preference.

5. The method of claim 2, wherein altering the listing comprises changing an order of television program listings within the electronic program guide.

6. The method of claim 2, wherein altering the listing comprises changing an appearance of the listing within the electronic program guide.

7. The method of claim 6, wherein a first background color is applied to the listing when the first community aggregated total exceeds the first threshold value.

8. The method of claim 2, wherein a second background color is applied to the listing when the second community aggregated total exceeds the second threshold value.

9. The method of claim 2, wherein altering the listing comprises changing a font associated with the listing in the electronic program guide.

10. The method of claim 1, wherein the first community is defined by a user of the second set-top box device.

11. The method of claim 10, wherein the first community comprises a group of set-top box devices located within a geographic area.

12. The method of claim 10, wherein the first community comprises a group of set-top box devices associated with a particular subscriber service.

13. The method of claim 10, wherein the first community comprises a group of set-top box devices associated with users of an age group.

14. The method of claim 1, further comprising comparing the first community aggregated total to a second threshold when the first community aggregated total exceeds the first threshold value to determine whether to apply additional emphasis to the television programming in the electronic program guide.

15. A system to provide program recommendations, the system comprising:

a program information server having a processor and a memory device accessible to the processor, wherein the memory device includes instructions executable by the processor to:
   receive a plurality of recommendations related to a television program listed within an electronic program guide from a plurality of first set-top box devices;
   receive a selection of a first community from a second set-top box device, wherein a first portion of the plurality of recommendations is from set-top box devices of the plurality of first set-top box devices that belong to the first community;
   receive a selection of a second community from the second set-top box device, wherein a second portion of the plurality of recommendations is from set-top box devices of the plurality of first set-top box devices that belong to the second community;
   receive a request for the electronic program guide from the second set-top box device; and
   determine an aggregated total of the plurality of recommendations by applying a first weighting factor to each recommendation of the first portion that is not included in the second portion, by applying a second weighting factor to each recommendation of the second portion that is not included in the first portion, and by applying a third weighting factor to each recommendation included in both the first portion and the second portion, wherein the third weight factor is different than the first weight factor and the second factor;
   wherein the first community and the second community are communities of a plurality of communities selected from a community definition interface, and wherein each community of the plurality of communities comprises a plurality of set-top box devices.

16. The system of claim 15, wherein the memory device includes instructions executable by the processor to alter a listing associated with the television program within the electronic program guide to indicate that the listing represents a recommended program when the aggregated total of recommendations associated with the television program exceeds a threshold.

17. The system of claim 16, wherein the memory device includes instructions executable by the processor to apply a first background color to the listing when the aggregated total of recommendations is greater than a first threshold and to apply a second background color to the listing when the aggregated total of recommendations is greater than a second threshold.

18. The system of claim 16, wherein the memory device includes instructions executable by the processor to send the electronic program guide to the second set-top box device.

19. The system of claim 15, wherein the memory device includes instructions executable by the processor to send data related to the electronic program guide and the plurality of recommendations to the second set-top box device.

20. The system of claim 15, wherein the third weighting factor is an average of the first weighting factor and the second weighting factor.

21. A non-transitory processor-readable storage medium that includes instructions executable by a processor to:
   receive a plurality of recommendations related to a television program listed by an electronic program guide from a plurality of first set-top box devices;
   receive a request for the electronic program guide from a second set-top box device;
   receive selections of a first community and a second community that are to influence program recommendations for the second set-top box device;
   determine a first aggregated total for the television program based on a first community weighting factor and recommendations of the plurality of recommendations from first set-top boxes that are associated with members of the first community; and
   alter a listing associated with the television program within the electronic program guide in a first manner to indicate that the listing represents a recommended program based on the first community when the first community aggregated total for the television program exceeds a first community threshold.

22. The non-transitory processor-readable storage medium of claim 21, further comprising instructions executable by the processor to associate each of the plurality of recommendations with a respective set-top box device.

23. The non-transitory processor-readable storage medium of claim 21, further comprising instructions executable by the processor to alter the listing associated with the television program within the electronic program guide in a second manner to indicate that the listing represents a recommended program based on a second community when a second community aggregated total for the television program exceeds a second community threshold.

* * * * *